United States Patent
Przykucki et al.

(10) Patent No.: US 10,094,683 B1
(45) Date of Patent: Oct. 9, 2018

(54) MAGNETICALLY ACTUATED PRESSURE SENSITIVE SUSPENSION POSITION SENSOR

(71) Applicants: Robert J. Przykucki, Redwood City, CA (US); Randy Fette, Santa Rosa, CA (US)

(72) Inventors: Robert J. Przykucki, Redwood City, CA (US); Randy Fette, Santa Rosa, CA (US)

(73) Assignee: MOTION INSTRUMENTS, INC., Redwood City, CA (US)

( * ) Notice: Subject to any disclaimer, the term of this patent is extended or adjusted under 35 U.S.C. 154(b) by 0 days.

(21) Appl. No.: 15/595,921

(22) Filed: May 15, 2017

(51) Int. Cl.
G01D 5/165 (2006.01)
G01M 17/04 (2006.01)
B62K 25/08 (2006.01)
G01L 9/00 (2006.01)

(52) U.S. Cl.
CPC ........... G01D 5/165 (2013.01); B62K 25/08 (2013.01); G01M 17/04 (2013.01); B62K 2207/00 (2013.01); G01L 9/0089 (2013.01)

(58) Field of Classification Search
CPC .. G01D 5/00; G01D 5/12; G01D 5/14; G01D 5/16; G01D 5/165; G01M 17/00; G01M 17/007; G01M 17/04; G01L 9/0089; B62K 25/00; B62K 25/04; B62K 25/06; B62K 25/08
USPC ....... 324/600, 649, 691, 693, 699, 704, 713, 324/714, 722, 723; 73/1.01, 1.57, 1.71, 73/12.01, 12.04, 12.07, 12.09, 12.12, 37, 73/39, 570, 662, 665, 114.01, 114.16, 73/114.18, 114.57, 862.37, 862, 381
See application file for complete search history.

(56) References Cited

U.S. PATENT DOCUMENTS

| | | | | |
|---|---|---|---|---|
| 4,425,557 A | * | 1/1984 | Nakamura | H01L 43/06 257/E43.002 |
| 5,464,079 A | * | 11/1995 | Lohberg | B60G 17/08 188/280 |
| 6,392,527 B1 | * | 5/2002 | Gilano | B60R 21/0132 280/735 |
| 7,978,186 B2 | * | 7/2011 | Vassallo | G06F 3/016 345/163 |
| 8,616,066 B2 | * | 12/2013 | Sprenger | G01L 9/0089 73/744 |
| 2005/0212189 A1 | * | 9/2005 | Kondo | F16F 15/03 267/195 |
| 2008/0290624 A1 | * | 11/2008 | Yamanaka | B60G 13/14 280/124.154 |
| 2011/0298399 A1 | * | 12/2011 | Ogawa | B60G 17/06 318/14 |
| 2016/0025765 A1 | * | 1/2016 | Panther | G01B 21/00 702/150 |

* cited by examiner

Primary Examiner — Hoai-An D Nguyen
(74) Attorney, Agent, or Firm — Mark Young, P.A.

(57) ABSTRACT

An elongated pressure sensitive potentiometer is disposed alongside and generally parallel to a reciprocating suspension component, such as a shock absorber, and between a steel track and a rolling or static magnet. The track and contained potentiometer extend from a mount at or near the top of a cylinder of the shock absorber to a point beyond the magnet when the shock absorber is in an uncompressed state. The mount couples the track to the shaft, parallel to and spaced apart from the shaft. Magnet attraction of the track compresses the potentiometer between the track and magnet.

20 Claims, 6 Drawing Sheets

SECTION A-A

MAGNETICALLY ACTUATED PRESSURE SENSITIVE SUSPENSION POSITION SENSOR

FIELD OF THE INVENTION

This invention relates generally to pressure sensitive sensors, and, more particularly, to a magnetically actuated pressure sensitive position sensor for a vehicle suspension.

BACKGROUND

Many bicycles, particularly mountain bikes, are equipped with adjustable suspensions. A correctly tuned suspension can make a good bicycle feel and handle great, but an un-tuned suspension can make even a superior bike feel and handle terrible. Many bicyclists with such suspensions are aware of the adjustments and the effect each adjustment should have. However, heretofore, bicyclists must make the adjustments by trial and error, typically overshooting and then undershooting optimal settings for a trail and/or their riding ability and style. Trial and error entails riding a trail and then making adjustments, and then riding the trail again and making new adjustments. The adjustments are made based upon a vague recollection of the ride and subjective assessment of performance. Such a process is not only inefficient, but prone to error.

What is needed is an easy-to-use, reliable, durable device that provides meaningful data regarding the performance of a suspension throughout a ride. Such data should be useful for tuning a suspension by increasing or decreasing sag, rebound damping and low and high speed compression damping. The data should indicate the range of travel of a suspension regardless of static or dynamic use. By knowing the position of the suspension over a period of time, many metrics can be derived from the data, either in real time or post analysis.

The invention is directed to overcoming one or more of the problems and solving one or more of the needs as set forth above.

SUMMARY OF THE INVENTION

To solve one or more of the problems set forth above, a sensor according to principles of the invention is comprised of an elongated pressure sensitive potentiometer disposed alongside a reciprocating suspension component, such as a shock absorber, and between a steel track and a rolling magnet. The magnet may be stationary, while the potentiometer and track move linearly relative to the magnet. Alternatively, the potentiometer and track may be stationary, while the magnet moves relative to the track. Adapted to a vehicle suspension, the track may be connected to a shaft of the shock absorber, while the magnet is connected to the cylinder of the shock absorber. The track, which contains the potentiometer, extends parallel to the shaft, parallel and adjacent to the cylinder. The track and contained potentiometer have sufficient length to extend from a mount at or near the top of the cylinder to a point beyond the magnet when the shock absorber is in an uncompressed state. The mount couples the track to the shaft, parallel to and spaced apart from the shaft.

Output from the potentiometer correlates to position of the magnet, which correlates to a relative position of the shock absorber. Such output may be determined and sampled and stored throughout a ride. The output may also be correlated with GPS and/or map data to indicate suspension conditions at particular map locations or trail segments. The output may also be correlated with data from various other sensors associated with the vehicle, such as a gyroscope (e.g., orientation and rotation data), one or more accelerometers (e.g., acceleration data) and/or a magnetometer (e.g., compass data). Data from various rides and from rides through different trails may be stored and compared.

Magnetic attraction of the track to the magnet reduces the space between the magnet and the track. The reduction in space compresses the potentiometer at the point between the magnet and track. The potentiometric output is a known function of the point of compression along the pressure-sensitive potentiometer. The reduction in space is made possible due to deflection of the track and/or play in the magnet holder.

The rolling magnet may be a wheel, cylinder or sphere. Such a configuration minimizes wear and tear to the potentiometer from friction. The magnet is preferably a permanent magnet, and more preferably a permanent magnet that generates an attractive force per unit area that exceeds the actuation pressure of the pressure-sensitive potentiometer.

In an exemplary implementation, a bicycle is equipped with a magnetically actuated pressure sensitive sensor. The bicycle has a fork with a pair of shock absorbers. The magnetically actuated pressure sensitive sensor includes a track having a track length and track width. The track includes a ferromagnetic web and a C-cross section shape, with a pair of opposed flanges extending from the web, and a pair of lips extending towards each other from the web. A space having a width is defined between the lips. The web, flanges and lips define a cavity having a width and depth. A potentiometer is attached to the web of the track. The potentiometer is a pressure sensitive potentiometer having a length that is not greater than the length of the track, and having width that is not greater than the width of the track. The sensor also includes a rolling permanent magnet having a diameter and a generally cylindrical or spherical shape. The magnet is support against the potentiometer by a holder adjacent to the track. The holder includes an axle about which the magnet rotates. The track is movable relative to the holder along a reciprocating axis orthogonal to the axis of rotation. The holder includes a neck having a width less than the width of the space between the lips of the track. The neck extends through the space between the lips. The holder includes a head attached to the neck and having a width greater than the width of the space between the lips. The cavity contains the head. The axle is operably coupled to the head of the holder. The holder includes a base. The neck is disposed between the base and the head. The head of the holder includes a slot having a width greater than the width of the magnet, The axle extends through the slot and the slot receives a portion of the magnet. The magnet attracts the ferromagnetic web of the track with force effective for actuating the potentiometer. The force compresses the potentiometer between the magnet and the web of the track. The track being a cantilever structure is deflectable towards the magnet. An attachment secures the holder to a first component of one of the pair of shock absorbers. A bracket secures the track to a second component of the one of the pair of shock absorbers. The first component and second component are concentric and the second component moves linearly relative to the first component along a path parallel (i.e., generally parallel) to the track. Movement of the second component relative to the first component causes equal movement of the track relative to the magnet. One of the first component and the second component is a cylinder of the shock absorber and the other of the first component and the second component is a shaft of the shock absorber, with the shaft of the shock absorber being movable telescopically relative to the cylinder of the shock absorber.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
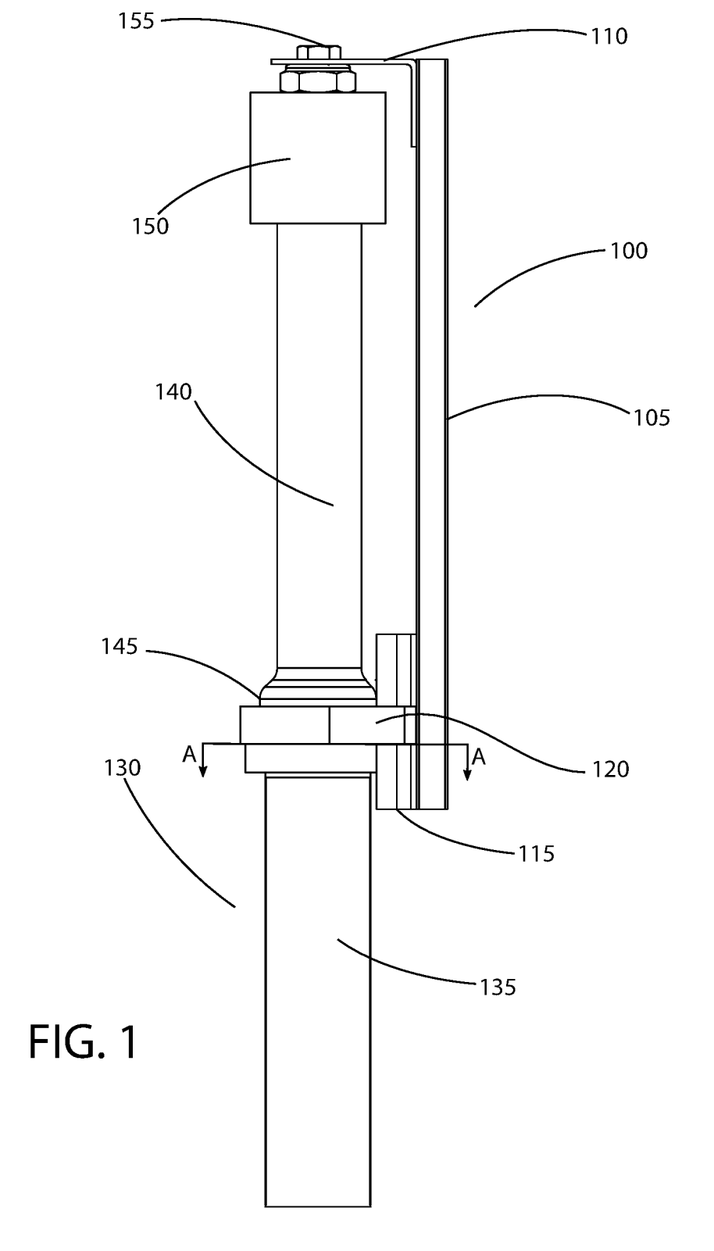
FIG. 1 is a profile view of an exemplary magnetically actuated pressure sensitive sensor assembly coupled to a vehicle shock absorber according to principles of the invention.

FIG. 1 provides a profile view of an exemplary suspension sensor assembly 100 according to principles of the invention. The sensor assembly 100 is attached to a shock absorber 130. The shock absorber 130 is attached to a fork of a bicycle. The shock absorber 130 includes a tube or shaft 140 coupled to a piston within a cylinder 135. The cylinder contains a hydraulic fluid for damping. One or more valves or orifices in the piston allow passage of fluid as the piston moves within the cylinder 135. As the tube 140 travels up and down (i.e., reciprocates) relative to the cylinder 135, hydraulic fluid is forced through the orifices in the piston. Because the orifices allow only a low flow rate, the piston is slowed substantially by the hydraulic fluid, which in turn slows down spring, tire and suspension movement. The exemplary shock absorber 130 depicted in the Figures includes an upper mount 150 with a mounting nut 155, and a collar 145 that provides a seal between the cylinder 135 and tube 140.

The invention is not limited to any particular type of shock absorber. Rather, a sensor according to principles of the invention may be used with any suspension damper that includes a component that undergoes linear reciprocating (compression and expansion) motion relative to another component. The shock absorber depicted in the Figures is a non-limiting example for context. The invention is also not limited to a shock absorber having the orientation of the exemplary shock absorber 130 shown in the Figures. The shock absorber may be oriented with the tube on top or bottom and with the cylinder on bottom or top.

Preferably, the shock absorber is adjustable. However, the invention will work with non-adjustable shock absorbers. In any case, the shock absorber 130 is a hydraulic damper that absorbs and damps shock impulses experienced during travel. The shock absorber 130 contains a piston with use valving of oil and gasses to absorb excess energy. Effective wheel bounce damping may require adjustment ("tuning") to an optimal resistance. Some shock absorbers allow tuning of the ride via control of the valve by a manual adjustment provided at the shock absorber. Some shock absorbers may allow adjustment of the range of travel, the resistance over the range of compressive and expansive travel, and the compression due to the weight of a rider, among other parameters.

Figure 4:
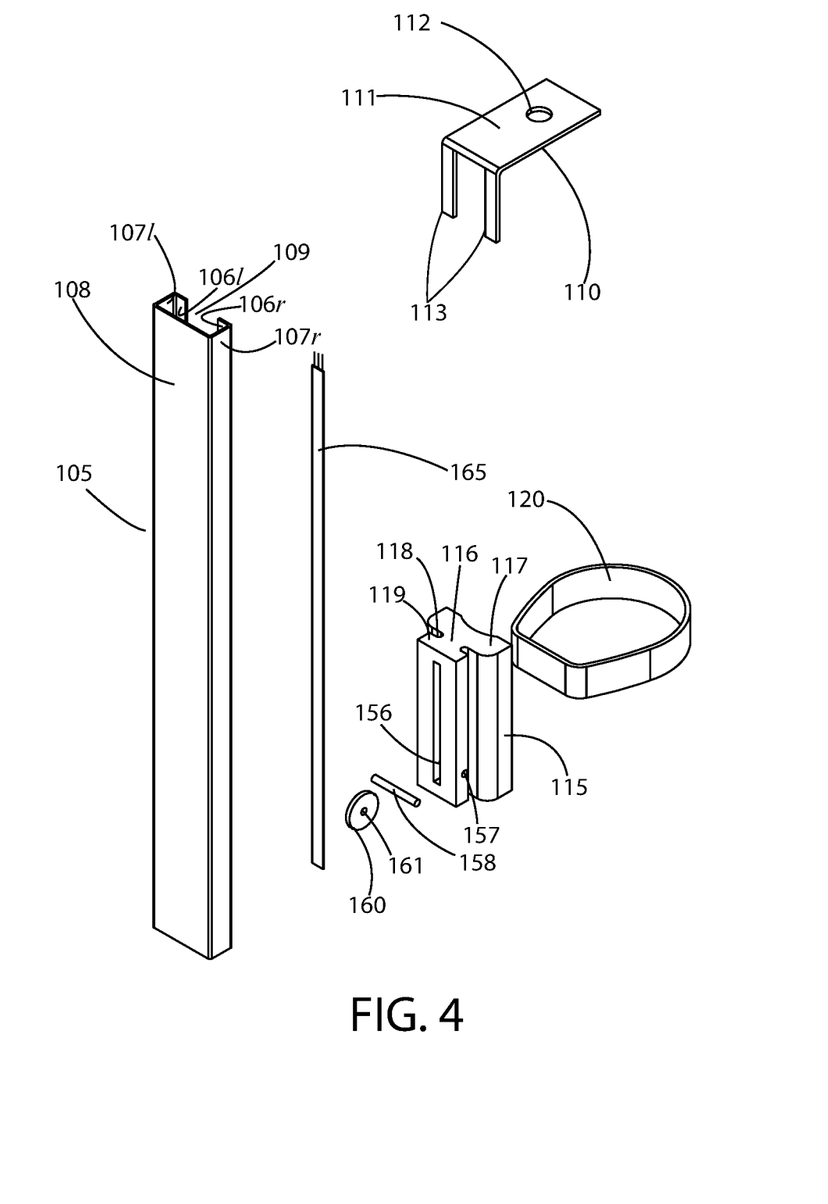
FIG. 4 is a first exploded perspective view of an exemplary magnetically actuated pressure sensitive sensor assembly coupled to a vehicle shock absorber according to principles of the invention.

The sensor assembly 100 includes a track 105. With reference to FIG. 4, the track 105 is a channel with a C shaped cross section, including a web 108 with a first flange 107*l* and opposite second flange 107*r*, a pair of opposed parallel lips (106*l*, 106*r*), one lip 106*l* extending from and coterminous with one flange 107*l* and the other lip 106*r* extending form and coterminous with the other flange 107*r*. The flanges 107*l*, 107*r* are coterminous with the web 108. The opposed lips 106*l*, 106*r* define a space 109. The space 109 provides access to the interior of the track 105, said interior being the cavity defined between the web 108, flanges 107*l*, 107*r* and lips 106*l*, 106*r*.

In a preferred embodiment, the track is comprised of a ferromagnetic material, such as iron, nickel, cobalt, their alloys (e.g., steel), or alloys of some rare earth metals. Alternatively, the track may be comprised of a material that is not attracted to a magnet, but contains a layer or strip of material on the web that is strongly attracted to a magnet. At a minimum, the web 108, and more particularly the surface of the web 108, or a material applied to the surface of the web 108 in the interior of the track 105, is ferromagnetic or otherwise attracted to a permanent magnet.

Figure 2:
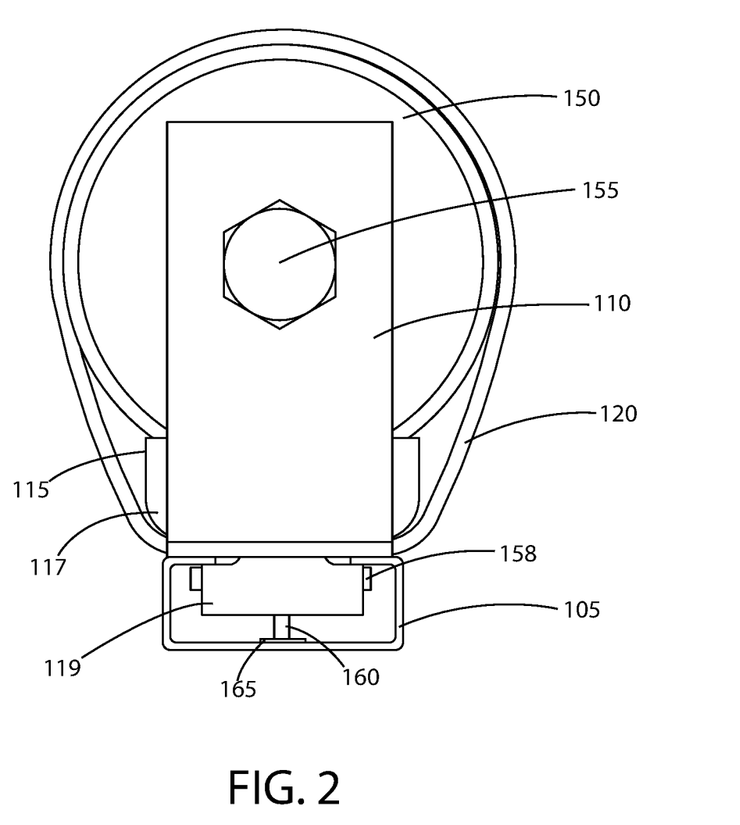
FIG. 2 is a plan view of an exemplary magnetically actuated pressure sensitive sensor assembly coupled to a vehicle shock absorber according to principles of the invention.
Figure 3:
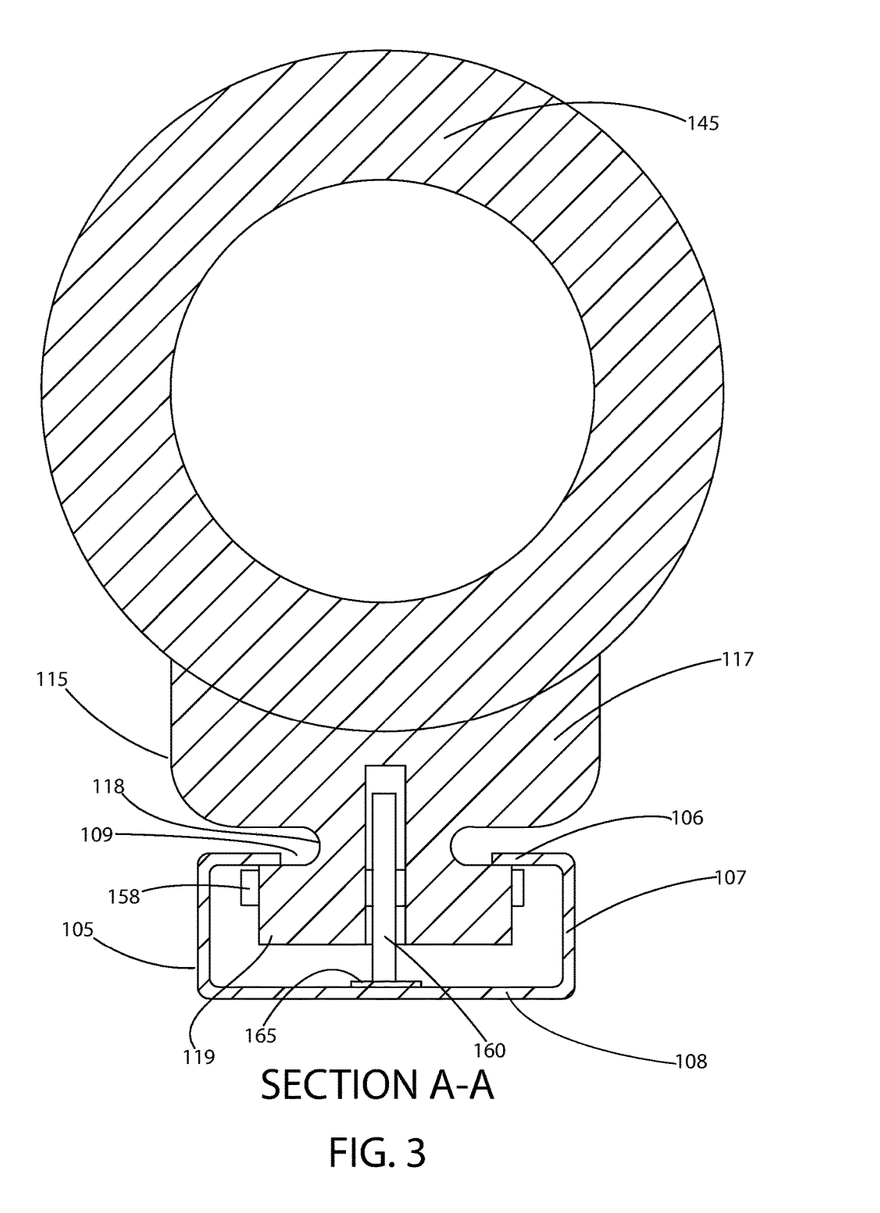
FIG. 3 is a section view of an exemplary magnetically actuated pressure sensitive sensor assembly coupled to a vehicle shock absorber according to principles of the invention.

A pressure sensitive potentiometer 165 is attached to the interior surface of the web 108 of the track, as shown in the plan and section views of FIGS. 2 and 3. The potentiometer 165 is an elongated structure, having a length that is no more than the length of the track 105, and preferably substantially the same length as the track or at least 0.75 times the length of the track. The width of the pressure sensitive potentiometer 165 is not more than the width of the web 108. The pressure sensitive potentiometer 165 is attached adhesively to the interior surface of the web 108. A non-limiting example of a pressure sensitive potentiometer 165 is described below with reference to FIG. 6.

Figure 5:
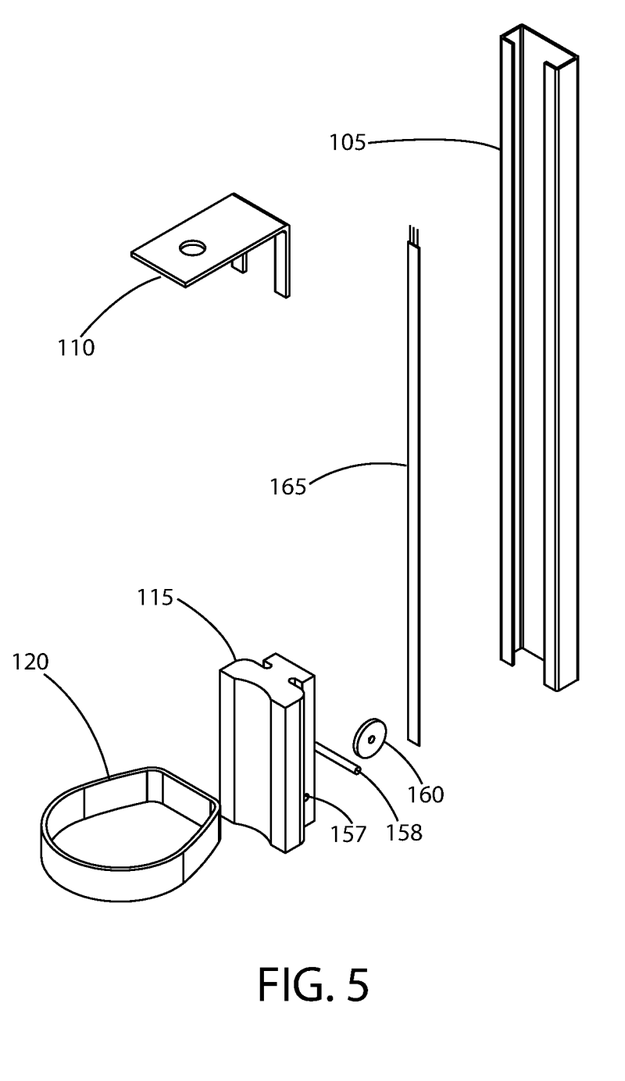
FIG. 5 is a second exploded perspective view of an exemplary magnetically actuated pressure sensitive sensor assembly coupled to a vehicle shock absorber according to principles of the invention.

The track 105 is coupled to a portion of the shock absorber 130. In the exemplary embodiment, a bracket 110 couples the track 105 to the shaft 140 of the shock absorber 130. The bracket 110 has an L-shaped profile. As illustrated in FIGS. 4 and 5, an exemplary bracket 110 includes a planar horizontal top 111 and a vertical track mount 113 at a right angle relative to the planar horizontal top 111. The top 111 includes a mounting hole 112 for attachment to the shock absorber 130. The hole 112 has a diameter sufficient to receive a threaded mounting shaft on the shock absorber, secured with a nut 155. The vertical track mount 113 is attached to the track 105, such as to the lips 106*l*, 107*r* or the web 108 of the track 105, as illustrated in FIGS. 1 and 2. The vertical track mount 113 may be mechanically fastened to the track with welds or any mechanical fastener such as rivets, screws, nuts and bolts, or snap-fit or friction-fit couplings.

The planar horizontal top 111 is sized to position the track 105 a determined distance from and generally parallel to the shock absorber 130. The determined distance is related to the magnet holder 115 and magnet 160, as described below. The magnet holder 115, which, in the exemplary embodiment is attached to the cylinder of 135 of the shock absorber at the collar 145, slidingly engages the track 105, as also described below. To enable such engagement and maintain a generally parallel alignment between the shock absorber 130 and the track 105, the planar horizontal top 111 of the bracket 110 positions the track 105 at a vertical plane to which the engaging portion of the magnet holder 115 reaches.

The magnet holder 115 includes a base 117, neck 118 and head 119. In the exemplary embodiment shown in the Figures, the base 117 abuts the cylinder 135 at the collar 145. The base 117 provides a foundation from which the neck 118 extends. The width of the neck 118 is less than the space 109 between the opposed lips of the track 105. The neck 118 extends through the space 109. The head 119 is wider than the space 109, but sized to loosely fit within the cavity defined between the web 108, flanges 107*l*, 107*r* and lips 106*l*, 106*r*. This configuration allows sliding motion of the head 119 within the cavity, while preventing withdrawal of the head 119 through the space 109.

A band 120 secures the magnet holder 115 to the cylinder 135. The band 120 may be a hose clamp, cable tie or other type of belt that can be opened and then closed and tightened to secure the magnet holder 115 to the cylinder 135. The band 120 extends across the head 119 at a position that does not interfere with rotation of the magnet 160. In other embodiments, the magnet holder 115 may be equipped with slots or buckles through which the band 120 extends. In yet other embodiments, the magnet holder 115 may be secured to the cylinder 135 with a U-bolt.

A rotating magnet mounts to the head 119 of the holder 115. The distal end of the head 119 includes a slot 156 and cylindrical channel 157. The the slot 156 bisects the cylindrical channel 157. An axle 158 fits within the cylindrical channel 157. The axle 158 extends through a central channel 161 in a spherical or cylindrical permanent magnet 160. The magnet 160 partially resides within the channel 156 and partially extends from the channel 156. The magnet 160 rotates about the axle 158.

The magnet 160 is preferably a permanent magnet, made from a material that is magnetized and creates its own persistent magnetic field. In an exemplary embodiment, the magnet 160 is a ceramic, or ferrite, magnet made of a sintered composite of powdered iron oxide and barium/strontium carbonate ceramic; or an alnico magnet made by casting or sintering a combination of aluminum, nickel and cobalt with iron and other elements; or a rare-earth magnet, such as a samarium-cobalt or neodymium-iron-boron magnet. The magnet may be coated (e.g., nickle or zinc plated or epoxy coated) to enhance durability and corrosion resistance.

Figure 6:
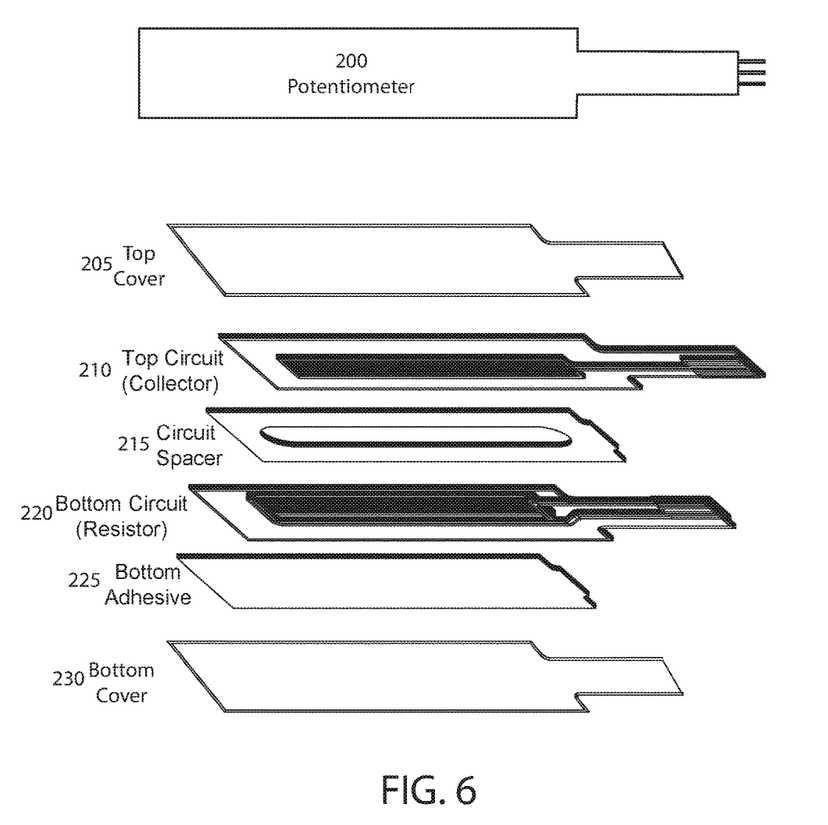
FIG. 6 is a schematic of an exemplary magnetically actuated pressure sensitive sensor for an exemplary magnetically actuated pressure sensitive sensor assembly according to principles of the invention.

The potentiometer 165 is an elongated strip, about as long as the range of travel of the shock absorber. An exemplary potentiometer 200 apart from the sensor assembly 100 is illustrated in FIG. 6. The potentiometer 200 is a sealed elongated pressure sensitive device. Such potentiometers contain a deflectable collector trace 210 spaced apart from a resistive trace 220 by a spacer 215. The resistive trace 220 may be adhered 225 to a cover or substrate 230. A pair of covers 205, 230 form a housing or sleeve in which the traces (circuits) 210, 220, spacer 215 and adhesive 225 are contained. Pressure exerted against the strip 200 at a point along its length causes the collector 210 to contact the resistive trace 220 to produce a potentiometric output. Resistance may increase linearly with distance of the resistive trace 220 from the electrodes. Thus, a detected resistance (e.g., in ohms) may be correlated to a point along the potentiometer 200 at which a pressure is exerted. In the sensor assembly 100, the resistance corresponds to the position of the magnet relative to the potentiometer, which corresponds to the amount of compression of the shock absorber.

Magnetic attraction between the magnet 160 and web 108 of the track 105 acts as a wiper. The magnet depresses the potentiometer strip 165, deflecting the collector trace 210 to contact the resistive trace 220 at the point of depression. Such contact creates a potentiometric output.

In an exemplary implementation, a force of about 1 to 3 N, exerted along the width of the potentiometer 165 at any point along its length, should be sufficient to actuate the sensor and produce a potentiometric output (e.g., resistance in ohms) that can be correlated to the lengthwise position. The magnet 160 may be sized with a width about equal to the width of the potentiometer 165, or the collector circuit of the potentiometer 165. In the latter case, the magnet may be aligned with the collector circuit to facilitate activation.

In a preferred embodiment, the magnet 160 rolls along the strip 165. The magnet 160 may be in the shape of a wheel, cylinder or sphere. The magnet 160 is attracted to the ferromagnetic track 105 (or the ferromagnetic material on the web 108 of the track 105). The magnetic attraction exerts a pressure at the point at which the magnet 160 rolls against the strip 165. The pressure compresses the contacted portion of the potentiometer strip 165. The pressure is a result of attraction between the magnet 160 and the track 105. Such attraction reduces the space between the web 108 of the track 105 and the magnet 160.

The reduction in space is possible as a result of play and/or deflection. The magnet 160 rotates about an axle 158. The axle 158 extends through a cylindrical channel 161 that extends through the center of rotation of the magnet 160. If the diameter of the cylindrical channel 161 is even slightly larger than the diameter of the axle 158, there is play (i.e., space for motion of the magnet towards the track).

The track 105 may behave like a cantilever beam or leaf spring. It may be elastic and deflected. Even a slight deflection of the track 105 due to the force of attraction by the magnet 160 may reduce the space between the track 105 and magnet 160 to exert sufficient pressure for a potentiometric output. The neck 118 of the magnet holder 115 allows sufficient movement of the track 105, during deflection, towards and away from the magnet 160, to enable compressive actuation of the potentiometer 165.

In other embodiments the track 105 may move linearly, from a first position to a second position, the first position being farther from the shock absorber 130 than the second position. A biasing means, such as a spring, may urge the track 105 towards the first position. The magnetic attraction may be sufficient to overcome the biasing means and reduce the space between the magnet 160 and the track 105.

Power is supplied to the sensor assembly via a battery. The battery may be disposable or rechargeable.

Output from the potentiometer 165 may be received by a portable data logger or microcontroller with storage memory (i.e., a receiver). The data logger may include an analog to digital converter to transform analog resistance readings from the potentiometer into digital data. The data may be correlated with time (e.g., time stamped or stored in a list of known time increments). The receiver may include an interface (e.g., serial [USB] interface or wireless [Bluetooth] interface) to communicate the logged data to a computer (e.g., a smartphone). The receiver may include one or more input channels, including one for the pressure-sensitive sensor assembly according to principles of the invention. A smartphone coupled to the receiver via an interface may correlate the sensor data with positioning/location data (e.g., GPS and/or map data). The sensor data may be used to objectively and accurately assess suspension performance for a particular rider, a particular vehicle, a particular ride and a particular trail. Adjustments may be made in an effort to optimize suspension performance.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A magnetically actuated pressure sensitive sensor comprising
    a track, the track having a track length and track width, the track including a ferromagnetic web;
    a potentiometer attached to the web of the track, the potentiometer being a pressure sensitive potentiometer having a length that is not greater than the length of the track, and having width that is not greater than the width of the track;
    a magnet having a diameter; and
    a holder adjacent to the track, the holder including an axle, the magnet having an axis of rotation and the axle extending through the axis of rotation, and the magnet being capable of rotation about the axle, the track being movable relative to the holder along a reciprocating axis orthogonal to the axis of rotation, and the holder supporting the magnet in abutting relationship to the potentiometer attached to the web of the track;
    the magnet attracting the ferromagnetic web of the track with force effective for actuating the potentiometer, the force compressing the potentiometer between the magnet and the web of the track.

2. The magnetically actuated pressure sensitive sensor of claim 1, the magnet having a shape from the group consisting of a cylinder and a sphere.

3. The magnetically actuated pressure sensitive sensor of claim 1, the magnet being a permanent magnet.

4. The magnetically actuated pressure sensitive sensor of claim 1, the track being a cantilever structure and deflectable towards the magnet.

5. The magnetically actuated pressure sensitive sensor of claim 1, the track including a C-cross section shape, including a pair of opposed flanges extending from the web, and a pair of lips extending towards each other from the web, and a space defined between the lips, the space having a width, and the web, flanges and lips defining a cavity, the cavity having a width and depth.

6. The magnetically actuated pressure sensitive sensor of claim 5, the holder including a neck having a width less than the width of the space between the lips of the track, the neck extending through the space between the lips.

7. The magnetically actuated pressure sensitive sensor of claim 6, the holder including a head attached to the neck, the cavity containing the head, the head having a width greater than the width of the space between the lips, and the axle being operably coupled to the head of the holder.

8. The magnetically actuated pressure sensitive sensor of claim 7, the holder including a base, the neck disposed between the base and the head.

9. The magnetically actuated pressure sensitive sensor of claim 8, further comprising an attachment securing the holder to a first structure.

10. The magnetically actuated pressure sensitive sensor of claim 9, the attachment comprising a strap.

11. The magnetically actuated pressure sensitive sensor of claim 9, a bracket securing the track to a second structure.

12. The magnetically actuated pressure sensitive sensor of claim 11, the first structure and second structure being concentric and the second structure being movable linearly relative to the first structure along a path, the path being parallel to the track, movement of the second structure relative to the first structures causing equal movement of the track relative to the magnet.

13. The magnetically actuated pressure sensitive sensor of claim 12, the first structure comprising a cylinder of a shock absorber and the second structure comprising a shaft of the shock absorber, the shaft of the shock absorber being movable telescopically relative to the cylinder of the shock absorber.

14. The magnetically actuated pressure sensitive sensor of claim 13, the head of the holder including a slot having a width, the magnet having a width, the width of the magnet being less than the slot, and the width of the slot being less than the width of the potentiometer.

15. The magnetically actuated pressure sensitive sensor of claim 14, the axle extending through the slot and the slot receiving a portion of the magnet.

16. The magnetically actuated pressure sensitive sensor of claim 13, the shock absorber attached to a fork of a two-wheel vehicle.

17. The magnetically actuated pressure sensitive sensor of claim 16, the two-wheel vehicle comprising a vehicle from the group consisting of a bicycle and a motorcycle.

18. The magnetically actuated pressure sensitive sensor of claim 1, further comprising a data logger operably coupled to the potentiometer.

19. The magnetically actuated pressure sensitive sensor of claim 18, further comprising a smartphone operably coupled to the data logger.

20. A bicycle equipped with a magnetically actuated pressure sensitive sensor, the bicycle having a fork with a pair of shock absorbers, the magnetically actuated pressure sensitive sensor comprising a track, the track having a track length and track width, the track including a ferromagnetic web, the track including a C-cross section shape, including a pair of opposed flanges extending from the web, and a pair of lips extending towards each other from the web, and a space defined between the lips, the space having a width, and the web, flanges and lips defining a cavity, the cavity having a width and depth;

a potentiometer attached to the web of the track, the potentiometer being a pressure sensitive potentiometer having a length that is not greater than the length of the track, and having width that is not greater than the width of the track;

a magnet having a diameter and a shape from the group consisting of a cylinder and a sphere, the magnet being a permanent magnet; and a holder adjacent to the track, the holder including an axle, the magnet having an axis of rotation and the axle extending through the axis of rotation, and the magnet being capable of rotation about the axle, the track being movable relative to the holder along a reciprocating axis orthogonal to the axis of rotation, and the holder supporting the magnet in abutting relationship to the potentiometer attached to the web of the track, the holder including a neck having a width less than the width of the space between the lips of the track, the neck extending through the space between the lips, the holder including a head attached to the neck, the cavity containing the head, the head having a width greater than the width of the space between the lips, and the axle being operably coupled to the head of the holder, the holder including a base, the neck disposed between the base and the head, the head of the holder including a slot having a width, the magnet having a width, the width of the magnet being less than the slot, and the width of the slot being less than the width of the potentiometer, the axle extending through the slot and the slot receiving a portion of the magnet;

the magnet attracting the ferromagnetic web of the track with force effective for actuating the potentiometer, the force compressing the potentiometer between the magnet and the web of the track, the track being a cantilever structure and deflectable towards the magnet;

an attachment securing the holder to a first component of one of the pair of shock absorbers;

a bracket securing the track to a second component of the one of the pair of shock absorber, the first component and second component being concentric and the second component being movable linearly relative to the first component along a path, the path being parallel to the track, movement of the second component relative to the first component causing equal movement of the track relative to the magnet, one of the first component and the second component comprising a cylinder of the shock absorber and the other of the first component and the second component comprising a shaft of the shock absorber, the shaft of the shock absorber being movable telescopically relative to the cylinder of the shock absorber.

* * * * *